United States Patent
Yoon

(10) Patent No.: US 9,142,247 B2
(45) Date of Patent: Sep. 22, 2015

(54) SPINDLE MOTOR WITH TURNTABLE FIXING MEMBER

(75) Inventor: Hoeop Yoon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 409 days.

(21) Appl. No.: 13/475,141

(22) Filed: May 18, 2012

(65) Prior Publication Data

US 2012/0293049 A1 Nov. 22, 2012

(30) Foreign Application Priority Data

May 19, 2011 (KR) ........................ 10-2011-0047314

(51) Int. Cl.
*H02K 5/16* (2006.01)
*H02K 5/167* (2006.01)
*H02K 7/09* (2006.01)
*H02K 7/14* (2006.01)
*G11B 19/20* (2006.01)
*G11B 17/028* (2006.01)
*G11B 17/051* (2006.01)

(52) U.S. Cl.
CPC .......... *G11B 19/2009* (2013.01); *H02K 5/1675* (2013.01); *H02K 7/09* (2013.01); *H02K 7/14* (2013.01); *G11B 17/0282* (2013.01); *G11B 17/0515* (2013.01)

(58) Field of Classification Search
CPC ........... G11B 17/0282; G11B 17/0515; H02K 5/1675; H02K 7/09; H02K 7/14
USPC ............. 310/67 R, 90, 91; 369/264; 720/706, 720/710

IPC ............................. H02K 5/16, 5/165, 7/09, 7/14
See application file for complete search history.

(56) References Cited

U.S. PATENT DOCUMENTS

| | | | | |
|---|---|---|---|---|
| 5,303,098 | A * | 4/1994 | Yamamori et al. | 360/99.12 |
| 5,796,547 | A * | 8/1998 | Ohkita et al. | 360/99.04 |
| 6,534,889 | B2 * | 3/2003 | Katagiri et al. | 310/91 |
| 6,741,544 | B1 * | 5/2004 | Masaki et al. | 720/702 |
| 7,839,719 | B2 * | 11/2010 | Dopf et al. | 367/84 |
| 2001/0038250 | A1 * | 11/2001 | Katagiri et al. | 310/67 R |
| 2002/0159381 | A1 * | 10/2002 | Bierhoff | 369/264 |
| 2004/0268376 | A1 * | 12/2004 | Yoo et al. | 720/702 |
| 2007/0277189 | A1 * | 11/2007 | Yasumoto et al. | 720/710 |
| 2009/0064212 | A1 * | 3/2009 | Ito et al. | 720/604 |
| 2009/0150915 | A1 * | 6/2009 | Woo | 720/702 |
| 2009/0224193 | A1 * | 9/2009 | Dopf et al. | 251/228 |
| 2010/0293563 | A1 * | 11/2010 | Park et al. | 720/696 |
| 2012/0293049 | A1 * | 11/2012 | Yoon | 310/67 R |

FOREIGN PATENT DOCUMENTS

JP 2002333053 A * 11/2002

OTHER PUBLICATIONS

Tsuchiya, JP 2002/333053, English translation, 2002.*

* cited by examiner

*Primary Examiner* — John K Kim
(74) *Attorney, Agent, or Firm* — Saliwanchik, Lloyd & Eisenschenk

(57) ABSTRACT

A spindle motor is disclosed, the spindle motor including a turntable coupled to the rotation shaft to rotate along with the rotation shaft and accommodating a disk, and a turntable fixing member coupled at an upper surface of the turntable to the rotation shaft to fix the turntable.

7 Claims, 3 Drawing Sheets

SPINDLE MOTOR WITH TURNTABLE FIXING MEMBER

CROSS-REFERENCE TO RELATED APPLICATION

This application claims the benefit under 35 U.S.C. §119 of Korean Patent Application No. 10-2011-0047314, filed May 19, 2011, which is hereby incorporated by reference in its entirety.

BACKGROUND

This section provides background information related to the present disclosure which is not necessarily prior art.

The present disclosure relates to a spindle motor.

Generally, a spindle motor is widely used as rotating means of a recording medium that requires a high speed rotation such as a hard disk drive or an ODD (Optical Disk Drive).

The spindle motor used in ODD may include a rotation shaft, a turntable rotating with the rotation shaft, and a center cone inserted into the rotation shaft to center a disk.

The spindle motor thus configured is reduced in thickness by the center cone to create a problem in which coupling force between the rotation shaft and the turntable is weakened, the turntable is slanted, or the rotation imbalance (run-out) is generated.

It is, therefore, desirable to overcome the above problems and others by providing an improved spindle motor.

BRIEF SUMMARY

This section provides a general summary of the disclosure, and is not a comprehensive disclosure of its full scope or all of its features.

The present disclosure is to provide a spindle motor configured to inhibit or restrict the slant of the turntable or generation of run-out of turntable by reinforcing a coupling force between a turntable and a rotation shaft.

Exemplary embodiments may, however, be implemented in many different forms and should not be construed as being limited to the embodiments set forth herein; Other features and advantages of the disclosed embodiments will be or will become apparent to one of ordinary skill in the art upon examination of the following figures and detailed description.

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

According to one aspect of the present disclosure, the object described above may be achieved by a spindle motor which comprises: a rotating rotation shaft; a turntable coupled to the rotation shaft to rotate along with the rotation shaft and accommodating a disk; and a turntable fixing member coupled at an upper surface of the turntable to the rotation shaft to fix the turntable.

In some exemplary embodiments of the present disclosure, the turntable fixing member is press-fitted into the rotation shaft.

In some exemplary embodiments of the present disclosure, the turntable fixing member takes a shape of a ring.

In some exemplary embodiments of the present disclosure, the turntable fixing member is a metal ring.

In some exemplary embodiments of the present disclosure, the turntable fixing member includes a reinforcing frame extended from an upper surface of the turntable fixing member to a periphery of the rotation shaft.

In some exemplary embodiments of the present disclosure, the turntable fixing member includes a reinforcing frame protruded to a direction facing a center cone along the periphery of the rotation shaft, and the turntable is formed with an accommodation groove accommodating the turntable fixing member.

In some exemplary embodiments of the present disclosure, an escape groove for inhibiting an interference with the turntable fixing member is formed at a bottom surface of the center cone opposite to the turntable fixing member.

In some exemplary embodiments of the present disclosure, the turntable fixing member is formed with a burring unit coupled to the periphery of the rotation shaft and opposite to the upper surface of the turntable, and the upper surface of the turntable is formed with a reception groove for receiving the turntable fixing member formed with the burring unit.

In some exemplary embodiments of the present disclosure, the upper surface of the turntable and the upper surface of the turntable fixing member are on a same plane.

In some exemplary embodiments of the present disclosure, the spindle motor further comprises: a bearing assembly including a bearing rotatably supporting the rotation shaft and a bearing housing accommodating the bearing; a stator including a core coupled to the periphery of the bearing housing and a coil wound the core; and a rotor including a yoke inserted into the rotation shaft to support the turntable and a magnet mounted on the yoke and opposite to the core.

In some exemplary embodiments of the present disclosure, a bottom surface of the turntable opposite to the yoke is formed with an accommodation groove of an adhesive for attaching the turntable to the yoke.

The spindle motor according to the present disclosure has an advantageous effect in that a metal ring-shaped turntable fixing member is arranged on a rotation shaft for inhibiting a coupling force between a turntable and a rotation shaft from being weakened by a center cone, whereby the coupling force between the turntable and the rotation shaft can be reinforced to inhibit and/or restrict the turntable from being slanted and/or imbalanced in rotation.

BRIEF DESCRIPTION OF DRAWINGS

Non-limiting and non-exhaustive embodiments of the present disclosure are described with reference to the following drawings, in which.

DETAILED DESCRIPTION

Figure 1:
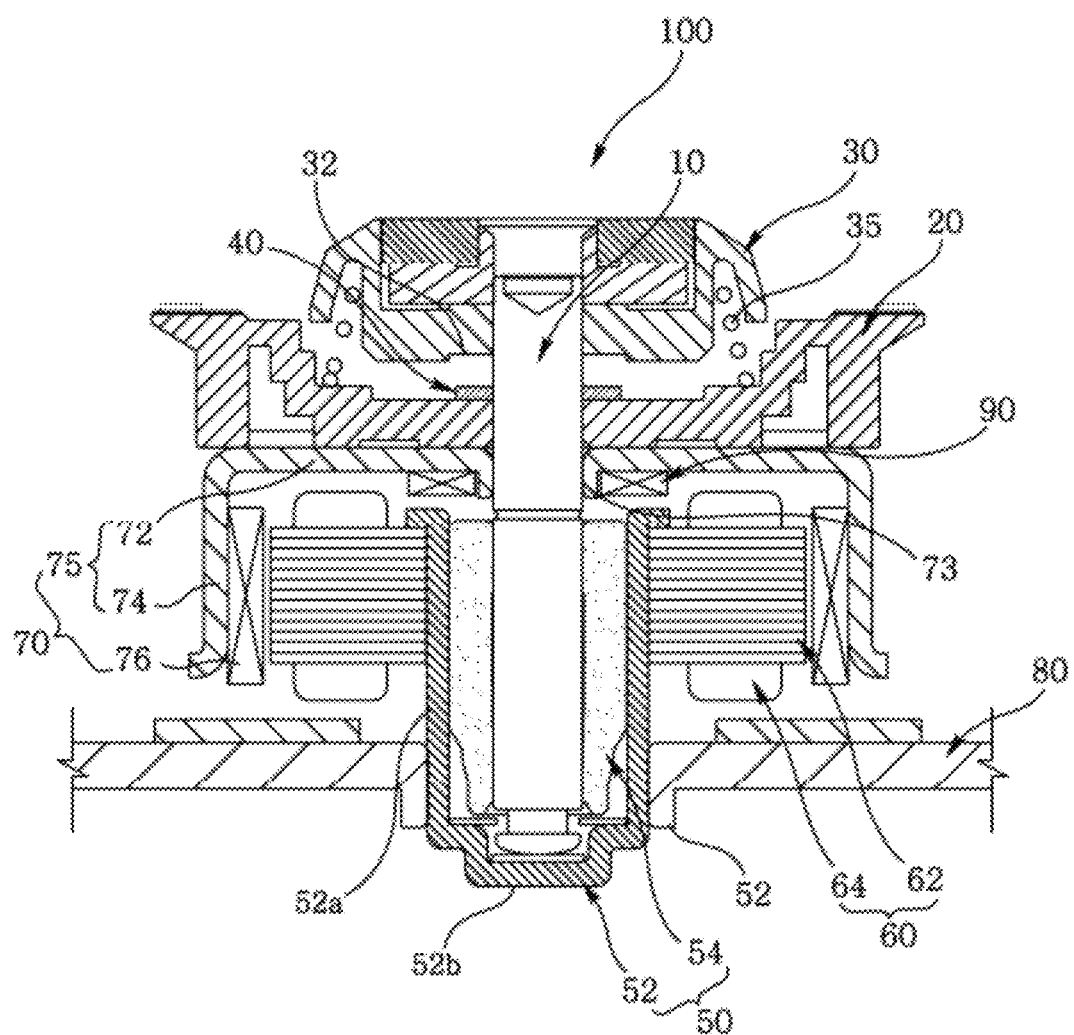
FIG. 1 is a cross-sectional view of a spindle motor according to an exemplary embodiment of the present disclosure.
Figure 2:
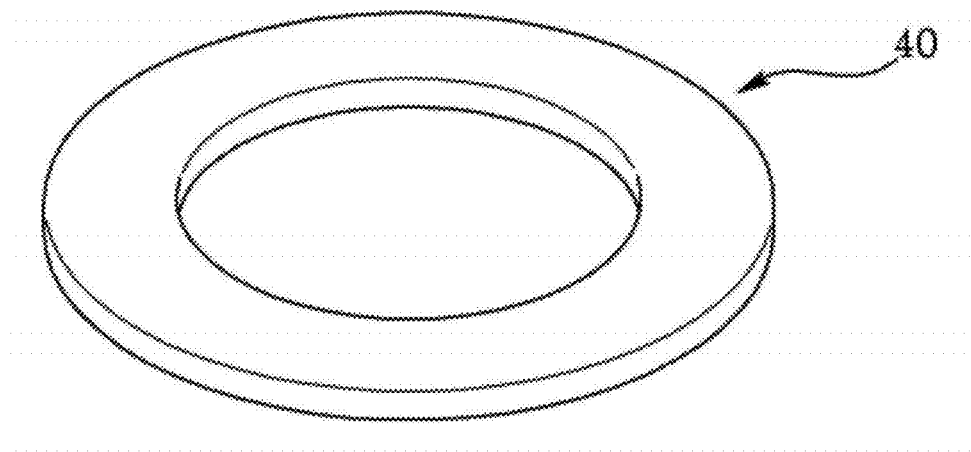
FIG. 2 is a perspective view illustrating a turntable fixing member of FIG. 1.

FIG. 1 is a cross-sectional view of a spindle motor according to an exemplary embodiment of the present disclosure, and FIG. 2 is a perspective view illustrating a turntable fixing member of FIG. 1.

Referring to FIGS. 1 and 2, a spindle motor 100 according to an exemplary embodiment of the present disclosure may include a rotation shaft 100, a turntable 20, a center cone 30 and a turntable fixing member 40.

The rotation shaft 10 is rotatably fixed by a bearing assembly 50, the bearing assembly 50 is coupled to a stator 60, and the rotation shaft 10 is coupled by a rotor 70. The bearing assembly 50 includes a bearing housing 52 and a bearing 54.

The bearing housing 52 may take a shape of an upper-opened cylinder, and be formed by a press work. Alternatively, the bearing housing 52 may be manufactured with a casting brass. The upper-opened cylindrical bearing housing 52 includes a lateral plate 52a and a floor plate 52b. The lateral plate 52a of the bearing housing 52 may take a cylindrical shape, for example, and the floor plate 52b may be formed at a bottom surface of the lateral plate 52a. In the exemplary embodiment of the present disclosure, the lateral plate 52 and the floor plate 52b may be integrally formed by a deep drawing process using a press work.

An upper surface of the lateral plate 52a of the bearing housing 52 is bent to a direction facing an outer side of the later plate 52a, and the bent portion functions to fix a core of the stator 60 by pressing the core of the stator 60. The bearing 54 may be accommodated in an accommodation space formed by the bearing housing 52, take a cylindrical shape formed with a rotation shaft hole, and include an oil impregnation sintered bearing, for example.

The bearing housing 52 is coupled to a base plate 80. The base plate 80 is formed with a burring unit 82, and the burring unit 82 is coupled by the lateral plate 52a of the bearing housing 52. The stator 60 includes a core 62 and a coil 64.

The core 62 is formed by stacking a plurality of iron pieces each having a thin thickness, and centrally formed with a through hole coupled to the lateral plate 52a of the bearing housing 52. An upper surface of the core 62 is brought into contact with a portion bent from the lateral plate 52a of the bearing housing 52 to inhibit the core 62 from being disengaged from the lateral plate 52a of the bearing housing 52. The rotation shaft 10 is rotatably inserted into the rotation shaft hole of the bearing 54 accommodated in the bearing housing 52. The rotor 70 includes a yoke 75 and a magnet 76.

The yoke 75 takes a bottom-opened cylindrical shape. To be more specific, the yoke 75 includes a yoke upper plate 72 and a yoke lateral plate 74. The yoke upper plate 72 takes a disk shape with a thin thickness, and is centrally formed with a yoke burring unit 73.

The yoke burring unit 73 is coupled to the rotation shaft 10, and the yoke 75 is rotated along with the rotation shaft when the yoke burring unit 73 is coupled to the rotation shaft 10. The yoke lateral plate 74 is extended to a direction facing a bottom surface from an external edge of the yoke upper plate 72. The magnet 76 is arranged at an inner lateral surface of the yoke lateral plate 74 and faces a lateral surface of the core 62. The yoke 75 and the rotation shaft 10 are rotated together by a magnetic field generated by the magnet 76 and magnetic field generated by the coil 64.

A suction magnet 90 is arranged at a bottom surface of the yoke upper plate 72 of the yoke 75. The suction magnet 90 takes a shape of a ring when viewed from a plan. As described in the above, the rotation shaft 10 is rotated by interaction between the stator 60 and the rotor 70, and the rotation shaft 10 is coupled with the turntable 20.

The turntable 20 takes a shape of a disk, and serves to support an optical disk. The turntable 20 is press-fitted into the rotation shaft 10, and a bottom surface of the turntable 20 is arranged on an upper surface of the yoke upper plate 72 of the yoke 75.

The rotation shaft 10 is inserted by a center cone 30 for centering the optical disk after the turntable 20 is press-fitted into the rotation shaft 10, and the center cone 30 moves along an axial direction of the rotation shaft 10, and a coil spring 35 is interposed between the center cone 30 and the turntable 20. The center cone 30 is elastically supported by the coil spring 35.

A concave groove may be formed on the upper surface of the turntable 20 for accommodating the center cone 30 arranged on the upper surface of the turntable 20. In a case the concave groove is formed on the upper surface of the turntable 20 for accommodating the center cone 30 arranged on the upper surface of the turntable 20, a portion opposite to the center cone 30 in the turntable 20 is formed with a relatively thin thickness over that of a portion not being opposite to the center cone 30, whereby the turntable 20 and the rotation shaft 10 are inter-coupled with a low coupling force. In a case the turntable 20 and the rotation shaft 10 are inter-coupled with a low coupling force, the turntable 20 may be slantedly arranged or there may be generated a run-out of the turntable 20.

The turntable fixing member 40 serves to reinforce the low coupling force between the turntable 20 and the rotation shaft 10 to inhibit the slant and the run-out of the turntable.

Referring to FIG. 2, the turntable fixing member 40 is inserted into the rotation shaft 10 to be arranged on the upper surface of the turntable 20, whereby the coupling force between the turntable 20 and the rotation shaft 10 can be reinforced. To this end, the turntable fixing member 40 is press-fitted into a periphery of the rotation shaft 10, and the bottom surface of the turntable fixing member 40 is brought into contact with the upper surface of the turntable 20.

In the exemplary embodiment of the present disclosure, in a case the turntable fixing member 40 is arranged on the upper surface of the turntable 20, the turntable fixing member 40 may interfere with a bottom surface of the center cone 30 vertically moving along the rotation shaft 10, such that the bottom surface of the center cone 30 may be formed with an escape groove 32 for inhibiting the center cone 30 from mutually contacting the turntable fixing member 40.

Alternatively, in a case the center cone 30 is not formed with the escape groove 32, it should be apparent that an accommodation groove may be formed on the turntable 20 for accommodating the turntable fixing member 40. A depth of the accommodation groove may substantially same as that of thickness of the turntable fixing member 40, whereby the upper surface of the turntable fixing member 40 and that of the turntable 20 may be on a same planar surface.

Figure 3:
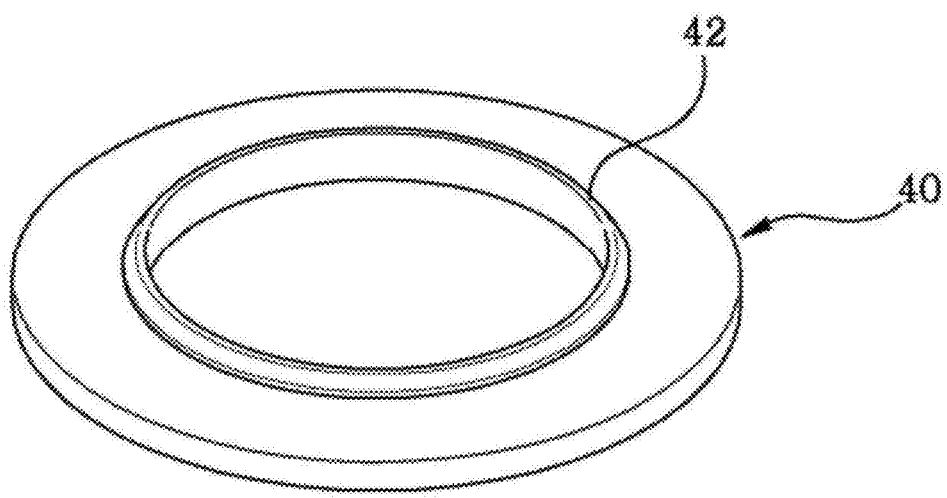
FIG. 3 is a perspective view illustrating a turntable fixing member of a spindle motor according to another exemplary embodiment of the present disclosure.

FIG. 3 is a perspective view illustrating a turntable fixing member of a spindle motor according to another exemplary embodiment of the present disclosure.

Referring to FIG. 3, the turntable fixing member 40 may be formed with a reinforcing frame 42 protruded along the periphery of the rotation shaft 10 at a predetermined height from the upper surface of the turntable fixing member 40. The reinforcing frame 42 increases a coupling area between the rotation shaft 10 and the turntable fixing member 40 to enable the turntable fixing member 40 to be more stably coupled to the rotation shaft 10 and the turntable 20.

Figure 4:
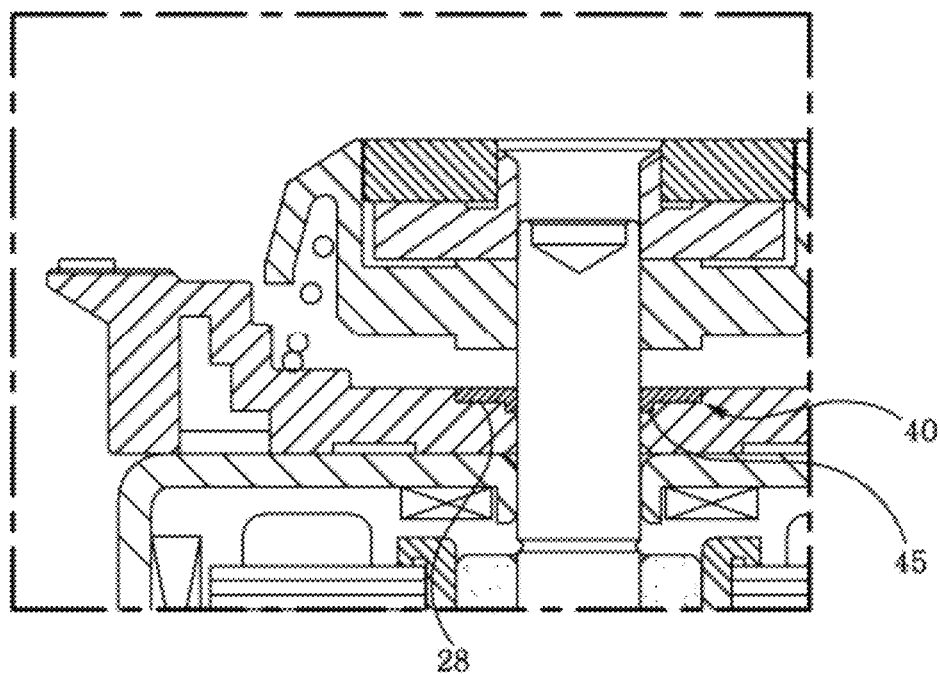
FIG. 4 is a cross-sectional view of a spindle motor according to still another exemplary embodiment of the present disclosure.
Figure 5:
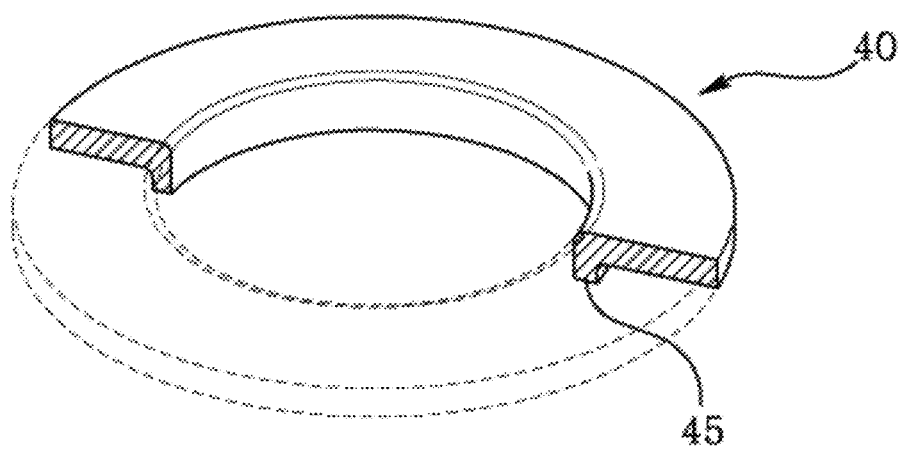
FIG. 5 is a cross-sectional view illustrating a turntable fixing member of FIG. 4.

FIG. 4 is a cross-sectional view of a spindle motor according to still another exemplary embodiment of the present disclosure, and FIG. 5 is a cross-sectional view illustrating a turntable fixing member of FIG. 4.

Referring to FIGS. 4 and 5, the turntable fixing member 40 is formed with a burring unit 45 protruded to a direction facing the bottom surface of the turntable fixing member 40 to be coupled to the periphery of the rotation shaft 10, The turntable 20 is formed thereon with an accommodation groove 28 accommodating the turntable fixing member 40 formed with the burring unit 45, where the upper surface of the turntable 20 and the upper surface of the turntable fixing member 40 are on a same planar surface. In a case the upper surface of the turntable 20 and the upper surface of the turntable fixing member 40 are on a same planar surface, it is possible to dispense with an escape groove for accommodating the turntable fixing member 40 on the center cone 30 facing the turntable fixing member 40.

As apparent from the foregoing, the spindle motor according to the present disclosure has an industrial applicability in that a metal ring-shaped turntable fixing member is arranged on a rotation shaft for inhibiting a coupling force between a turntable and a rotation shaft from being weakened by a center cone, whereby the coupling force between the turntable and the rotation shaft can be reinforced to inhibit and/or restrict the turntable from being slanted and/or imbalanced in rotation.

Any reference in this specification to "one embodiment", "an embodiment", "exemplary embodiment", etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments. As may be used herein, the singular forms "a", "an" and "the" are intended to include the plural forms as well, unless the context clearly indicates otherwise. As may be used herein, the terms "substantially" and "approximately" provide an industry-accepted tolerance for its corresponding term and/or relativity between items.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor comprising:
   a rotation shaft;
   a turntable coupled to the rotation shaft to rotate along with the rotation shaft and to support a disk;
   a center cone coupled to a portion of the rotation shaft and disposed over the turntable to move along an axis of the rotation shaft and to fix the disk, wherein a portion of the turntable opposite to the center cone is formed with a thickness thinner than that of a portion of the turntable not being opposite to the center cone, such that the turntable and the rotation shaft are coupled with a low coupling force; and
   a ring-shaped turntable fixing member coupled to the rotation shaft and disposed on an upper surface of the turntable to fix the turntable,
   wherein the turntable fixing member is a metal ring provided with a reinforcing frame extending from a surface of the turntable fixing member along a periphery of the rotation shaft so as to increase a coupling area between the rotation shaft and the turntable fixing member, and
   wherein the turntable fixing member is press-fitted into the periphery of the rotation shaft.

2. The spindle motor of claim 1, wherein the reinforcing frame protrudes in a direction toward the center cone, and the turntable is formed with an accommodation groove accommodating the turntable fixing member.

3. The spindle motor of claim 1, wherein the center cone is provided with an escape groove at a bottom surface of the center cone opposite to the turntable fixing member for inhibiting the center cone from contacting the turntable fixing member.

4. The spindle motor of claim 1, wherein the reinforcing frame is formed with a burring unit that protrudes in a direction toward a bottom surface of the turntable fixing member and is coupled to the periphery of the rotation shaft and, the upper surface of the turntable is formed with an accommodation groove for receiving the turntable fixing member formed with the burring unit.

5. The spindle motor of claim 4, wherein the accommodation groove has a depth equal to a thickness of the turntable fixing member.

6. The spindle motor of claim 5, wherein the upper surface of the turntable and an upper surface of the turntable fixing member are on a same plane.

7. The spindle motor of claim 1, further comprising: a bearing assembly including a bearing rotatably supporting the rotation shaft and a bearing housing accommodating the bearing; a stator including a core coupled to a periphery of the bearing housing and a coil wound around the core; and a rotor including a yoke inserted into the rotation shaft to support the turntable and a magnet mounted on the yoke and being opposite to the core.

* * * * *